United States Patent [19]

Pizzorno

[11] Patent Number: 4,872,822
[45] Date of Patent: Oct. 10, 1989

[54] TIRE CURING PRESS MECHANISM

[75] Inventor: Augusto Pizzorno, Milan, Italy

[73] Assignee: Pirelli Coordinamento Pneumatici S.p.A., Milan, Italy

[21] Appl. No.: 124,980

[22] Filed: Nov. 24, 1987

[30] Foreign Application Priority Data

Dec. 1, 1986 [IT] Italy .............................. 22514 A/86

[51] Int. Cl.$^4$ ............................................ B29D 30/06
[52] U.S. Cl. ...................................... 425/48; 264/315; 425/58
[58] Field of Search ................... 425/48, 35, 58, 28.1; 264/315, 326

[56] References Cited

U.S. PATENT DOCUMENTS

| | | | |
|---|---|---|---|
| 2,970,342 | 2/1961 | Frohlich et al. | 425/48 X |
| 3,890,073 | 6/1975 | Getz | 425/48 |
| 3,976,409 | 8/1976 | Athey | 425/48 |
| 4,684,338 | 8/1987 | Steidl et al. | 264/315 X |

FOREIGN PATENT DOCUMENTS

| | | |
|---|---|---|
| 1064234 | 8/1959 | Fed. Rep. of Germany . |
| 2048745 | 4/1971 | Fed. Rep. of Germany . |
| 57-6743 | 1/1982 | Japan .................................. 425/48 |
| 57-39941 | 3/1982 | Japan .................................. 425/48 |
| 1024299 | 6/1983 | U.S.S.R. ............................. 425/48 |

Primary Examiner—Richard L. Chiesa
Attorney, Agent, or Firm—Birch, Stewart, Kolasch & Birch

[57] ABSTRACT

To obtain and expedite an automatic engagement and disengagement of the bladder with respect to the relative operating mechanism, in particular in presses used for curing pneumatic tires, the movable clamp and the fixed clamp, respectively, which block the beads of the flexible, elastically deformable sleeve constituting the bladder, comprise annular grooves, coaxial with the axis of the bladder, which, in operation interact with the heads of a plurality of pegs situated in the head to be assembled to the movable clamp and in the body of the support to be associated to the fixed clamp, the pegs being radially movable in both senses between two positions, i.e. a work position in the operating condition and a rest position in which said pegs are completely collapsed into the body of said head and of the support so as to allow the axial insertion of the bladder on the mechanism and its removal therefrom.

21 Claims, 4 Drawing Sheets

TIRE CURING PRESS MECHANISM

BACKGROUND OF THE INVENTION

The present invention relates to presses used for curing pneumatic tires and, more specifically, it concerns the bladder mounted on the press and the mechanism used for the operation of the press.

It is known that to cure hollow articles of elastomeric or plastomeric material having a relatively thin wall, curing molds are used which are formed by at least two hollow halves, mutually engageable and disengageable, able to allow the insertion and the subsequent removal of the article being cured, which, when the mould is closed, presents an outwardly closed cavity, defining the external shape of the article itself.

Inside the mould a bladder is provided, constituted by a flexible envelope, generally made of cured elastomeric material, reinforced if desired, with textile or metal cords, which is inflated by a fluid under pressure at a high temperature. By virtue of the inflation fluid, the bladder expands against the internal surface of the article being cured, thus pressing the wall of the latter against the inner surface of the mold until to the end of the curing cycle.

When the curing cycle is over, the bladder is deflated or placed under vacuum to reduce its overall size, so that the removal of cured article from the mould, which has been opened in the meantime, is facilitated.

All of the movements necessary to open or close the mold and to operate the bladder are carried out by means of a machine of well known structure, known as a curing press.

For the sake of clarity and simplicity and in view of a better understanding, the invention will be described with specific reference to the presses used to cure pneumatic tires, although it is clearly evident from the previous introduction that the invention itself is not restricted to this machine to obtain this specific product, but concerns all the range of machines which comply with the above indicated requirements.

The conventional press used for curing pneumatic tires is well known. Substantially, it is formed of a base and of an upper frame, movable with respect thereto. The base carries a curing mould constituted of two opposite coaxial hollow elements, one fixed to the base and the other connected to a frame, which, in position of assembly (press and mold closed), define a cavity which reproduces the outer toroidal surface of the tire being cured.

Sometimes, in the mold, the two hollow elements have the shape of two annular plates corresponding to the tire sidewalls and the mold comprises a plurality of sectors, arranged circumferentially and inserted between the plates, which are connected to the frame by an annular device with inclined plates, so as to be radially movable in both senses with respect to the two annular plates and axially movable in both senses with respect to at least one of the plates.

Irrespective of the type of mold used, the presses concerned by the invention are provided with a bladder arranged coaxially inside the hollow elements or the annular plates and necessary for the admission of fluid under pressure inside the tire being cured, whose operation is controlled by an actuation mechanism permanently housed in the base.

Although the bladder is actually the only flexible envelope, in the present specification as set forth hereinafter and in the appended claims the expression "bladder", for simplicity's sake, will indicate the assembly formed by the flexible envelope and the two end clamps which block the envelope and guide its shaping during the press working cycle. The flexible envelope, by itself, will be referred to as the "cylindrical sleeve", such being substantially its shape in a rest condition.

It is known that the bladder must be replaced with a certain frequency during the press working cycle, owing to its natural wear or for accidental causes depending on the severe working conditions, or when the mould is to be changed, because the size of the tire being cured changes.

Also, it is known that all of the operations necessary to change the equipment are to be carried out manually and are consequently long and expensive, since it is necessary to await for press cooling before effecting the equipment substitution and then to bring the press back to the pre-established temperature before re-starting the curing operation.

Therefore, it can be easily understood how deep is the interest of the technician in a machine and apparatus which would permit automatic replacement of the equipment and immediate operation after the end of a curing cycle, namely on the press still at a high temperature.

In fact, studies were conducted with reference to mold substitution; however, the problem was not completely solved since the automatic replacement of the bladder did not yet find a convenient solution.

SUMMARY OF THE INVENTION

In accordance with the present invention a new type of bladder, together with its relative operation mechanism, is disclosed by means of which the above problem can be considered as completely overcome, since the replacement of the bladder takes place quite automatically on the machine in a very short time interval, while the machine is still hot, so that cooling experienced by the press and the mold during replacement is of a moderate amount and idle time is not required to again reach the curing temperature.

The present invention aims at providing a bladder and the corresponding mechanism for this operation, which is able to permit an expedited engagement and disengagement of the bladder with respect to the mechanism.

Accordingly, a first object of the present invention is represented by a bladder comprising a substantially cylindrical, flexible and elastically deformable sleeve provided with beads on each end, a movable clamp to block one end of the sleeve and a fixed clamp to block the other end of the sleeve, the movable clamp comprising a disc provided with a coaxial hub and a first fastening ring secured to the disc, the disc and the ring having a peripheral portion of their surface which can be associated with a first bead of the sleeve, and connecting means to block the first bead between the disc and the ring, the fixed clamp comprising a pair of distinct coaxial elements to be firmly secured together, each element having an annular portion of its surface which can be associated with the second bead of the sleeve, and a connecting means to block the second bead on the fixed clamp, the bladder being characterized in that it includes devices for the automatic engagement and disengagement of the movable and fixed clamps with respect to a corresponding supporting and operating mechanism.

A second object of the invention, in any case inseparable from the above cited first object of the same, is represented by a supporting and operating mechanism for the bladder, the mechanism comprising a support to be associated with the fixed clamp of the bladder and a stem, coaxial with the support, axially slidable into it, to be associated with the movable clamp of the bladder, and means to carry out the axial displacement of the stem with respect to the support, the mechanism being characterized in that the support and the stem are provided with devices for the automatic engagement and the disengagement of the movable and fixed clamps.

According to an appropriate embodiment of the invention, the devices comprise an annular groove obtained on the radially inner surface of the movable clamp and another annular groove obtained on the radially outer surface of a flanged tube which represents one of the two elements constituting the fixed clamp, the other element being constituted by a ring fastening the bead, which can be integrally associated to the flanged tube.

Correspondingly, the devices provided on the mechanism actuating the bladder according to the invention comprise a plurality of pegs, housed into corresponding holes, positioned both on a head fast or integral with the end of the stem which is to be associated to the movable clamp, and on the support which is to be associated with the fixed clamp, the pegs being radially movable in both senses, in a plane perpendicular to the axis of the mechanism, between two positions, namely an expanded or work position and a collapsed or rest position, respectively, means being provided to move the pegs from the collapsed to the expanded position, the pegs in the expanded position being at least partially protruding from the lateral surfaces of the head and of the support which face the corresponding surfaces of the hub and of the flanged tube and being housed in the corresponding annular grooves obtained on the hub and on the flanged tube.

In a preferred embodiment, the head integral or fast with the stem and associable to the movable clamp is cup-shaped. Its lateral wall is provided with radial holes, whose axis lies in a plane perpendicular to the axis of the stem, to house corresponding pegs alternatively movable radially between the expanded position and the collapsed position, the pegs being provided, on their end directed towards the cup inside, with two axially opposite wings, the motion of the pegs between the two positions comprising a rotation around one of the wings, the cup containing an axial small piston, shaped as an overturned goblet and axially slidable inside the cup, contrast means being provided to prevent the small piston from exiting the cup and elastically deformable means being provided to control the axial motion of the small piston with respect to the cup.

Further, the means causing the motion of the pegs from the collapsed to the expanded position are conveniently represented by cam profiles obtained on elements coaxial with the axis of the mechanism and revolving about their own axis, as for instance a cam encased inside a cup-shaped head, integral with the stem end, associated to the movable clamp, and a ring nut revolving about an annular flange fast with the support, the latter being provided with a coaxial bush comprising the pegs, radially displaceable to be associated to the fixed clamp.

Vice versa, in the head to be connected to the movable clamp, carried out according to the preferred embodiment, the displacement of the pegs from the collapsed to the expanded position is driven by the relative axial movement of the small piston.

Finally, the bladder according to the invention comprises devices, as for instance further annular grooves obtained on the radially outer surfaces of the movable and fixed clamps, in order to be picked up, transported and released, in a completely automatic manner, by appropriate pliers having gripping arms at least radially movable in both senses but, preferably, also axially movable in both senses with respect to the axis of the pliers.

BRIEF DESCRIPTION OF THE DRAWINGS

The present invention will be better understood with reference to the following description and to the attached drawings, given only by way of non-limiting illustration and are considered to be, in which.

DETAILED DESCRIPTION

Figure 1:
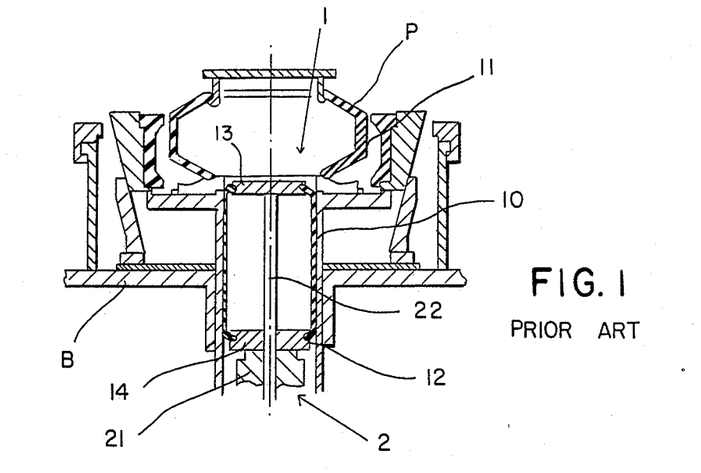
FIGS. 1, 2, 3 illustrate the state of the prior art.
Figure 2:
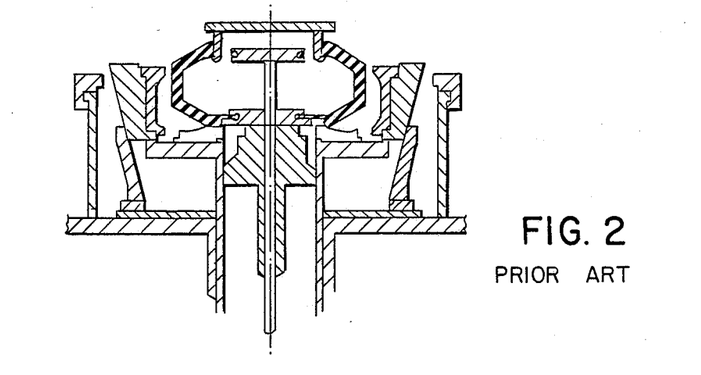
Figure 3:
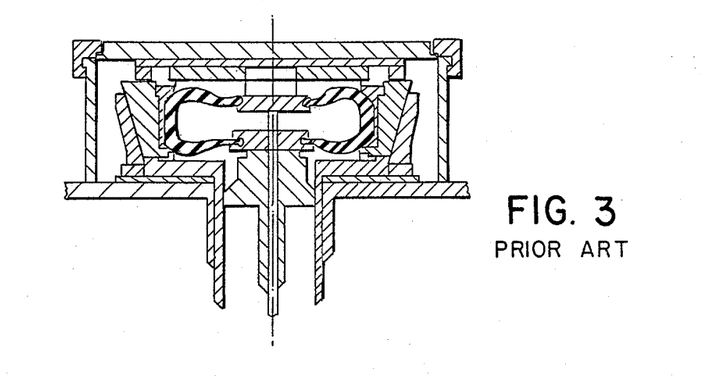

The first three figures illustrate the state of the art, on which the present invention is based, with reference to a peculiar type of press, equipped with a mould of the so-called "centripetal" kind, namely one comprising two axially opposite halves and a crown of radial sectors interposed between the halves of conventional construction.

The base B of the press, coaxial with the mold (FIG. 1), carries, encased into it, the bladder configuration 1 which comprises a flexible cylindrical sleeve 10 provided with end beads 11 and 12 retained between two clamps, herein indicated as movable clamp 13 and fixed clamp 14, respectively, since the latter, on certain presses, is integral with the base.

The movement of the clamps is controlled by an operating mechanism 2, permanently secured to the press and contained in the base, which is coaxial with the mold and the bladder configuration and comprises a support 21, axially movable with respect to the base on which is fastened clamp 14, and a stem 22, coaxially slidable within support 21 and having one end secured to the movable clamp 13.

Obviously, the other ends of stem 22 and of support 21 are linked to the devices carrying out their movements, which are not illustrated.

The figures, which have the only task of defining in its general structure the bladder and the relative operating mechanism, illustrate the loading of an uncured tire into the curing mold in three different phases, (1) the insertion of the uncured tire P in the mold opened (FIG. 1), (2) the arrangement of the bladder, and in particular of the sleeve, into the uncured tire by partial inflation of the bladder itself (FIG. 2) and (3) the mold closure (FIG. 3).

The invention concerns, therefore, the bladder configuration and its operating mechanism, since these elements are provided with means which allow a quick substitution of the former on the latter.

Figure 4:
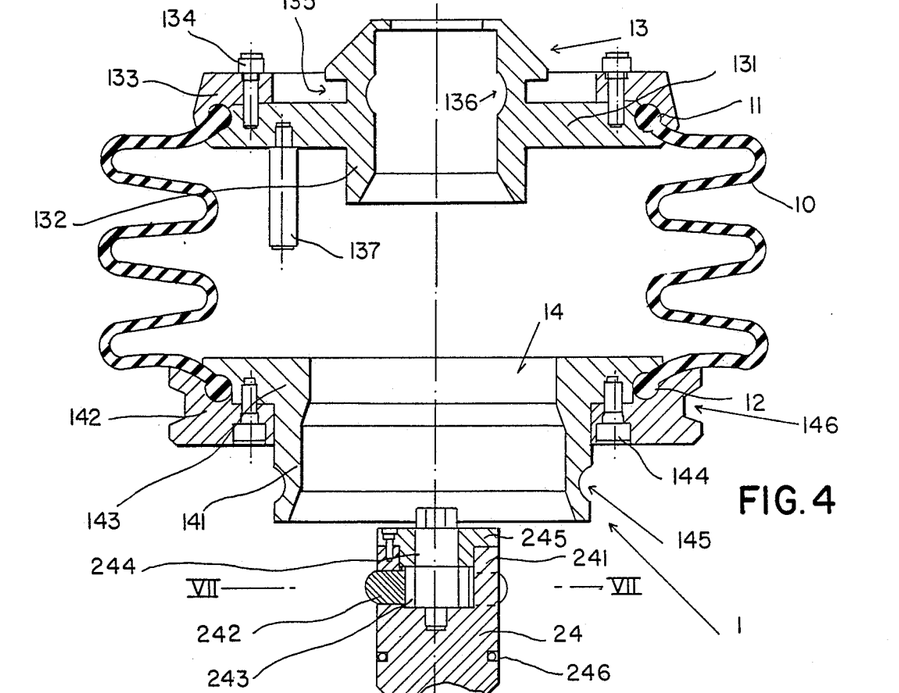
FIG. 4 illustrates in cross-section the particulars of the bladder configuration according to the present invention.

The bladder configuration is represented in detail in FIG. 4, from which it is possible to see the cylindrical sleeve 10 with its ends beads 11 and 12 blocked between the two clamps 13 and 14.

The movable clamp 13 comprises a disc 131 having a coaxial hollow hub 132, axially extending on both parts of the disc and opened outwardly from both sides, namely axially holed.

A portion of the disc peripheral surface is shaped in such a way as to be associated with bead 11 without damaging the bead or the immediately adjacent sleeve portion on account of the deformations suffered by the sleeve in use and during the bladder substitution.

A first fastening ring 133 is integrally secured on the disc edge by conventional means 134, for instance bolts. Also, a portion of the ring surface can be associated to bead 11 in the same manner as foreseen for the disc. Moreover, the assembling of ring 133 on disc 131 causes the blocking of bead 11 on clamp 13.

The radially outer surface of the hub, which is directed towards the axially outer surface of the disc, is provided with an annular groove 135 whose function will be explained below.

Also the radially inner surface of the hub is provided with an annular groove 136, preferably without sharp edges, which in the drawing is shown as corresponding to the outer annular groove.

Also the function of this groove will be indicated hereinafter; however, it is now pointed out that groove 136 can be located at any point of the hub body, along the axial development of the latter, and more precisely it can be situated in the hub portion, both on its radially outer and on its radially inner surface, which is directed towards the axially inner surface of the disc.

At last, a spacer 137 can be mounted on the inner surface of the disc in order to obtain the minimum desired distance between the clamps during the various operations.

The fixed clamp 14 comprises a tube 141 flanged at one end, and a second fastening ring 142, which can be made integral with flange 143 of the tube by virtue of conventional connecting means 144, for example bolts.

Like in clamp 13, also the tube flange and the relative fastening ring have a portion of their peripheral surface which is so shaped as to be associated without any prejudice to the bead 12 of the sleeve 10, locking moreover the bead on clamp 14.

The clamp body is provided with an annular groove 145, described in detail hereinafter, which is here represented on the radially outer surface of the tube, but which could be obtained on its radially inner surface.

Finally, the fastening ring 142 has an annular groove 146 on its axially outer surface. The function of this groove will be considered below.

As it will be clearly apparent, the bladder structure according to the invention permits an expedited engagement and disengagement of the relative opening mechanism, provided that the latter comprises corresponding means exploiting the bladder features.

Figure 5:
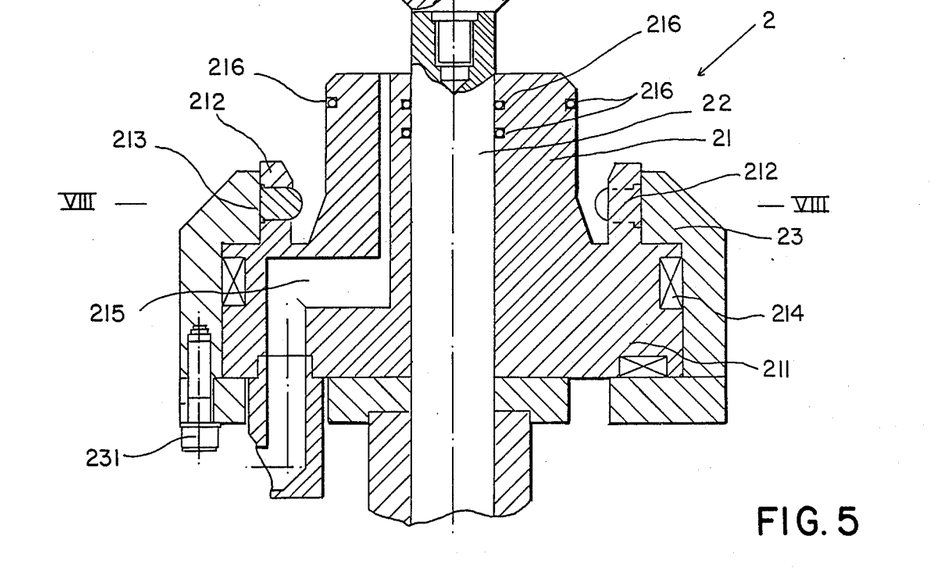
FIG. 5 illustrates in cross-section the mechanism for operating the bladder shown in FIG. 4.

FIG. 5 illustrates the mechanism operating according to the invention, which is associated to the bladder structure or assembly.

The operating mechanism 2 comprises substantially an axially holed annular support 21, which can be movable or fixed with respect to the base of the press on which it is associated, a coaxial stem 22, axially slidable in the support, and an annular ring nut 23, coaxially rotating around the support 21.

As already noted, support 21 is associated to the fixed clamp, while the end of stem 22 is associated to the movable clamp, so that the movement of the stem, of the support, and of the former with respect to the latter, originate the operation of the bladder as required for the various steps of the curing process.

To assemble the movable clamp 13 on the end of stem 22, a head 24 is appropriately provided which is made fast, integral or continuous with the stem 22, for instance, by screwing in the stem body, according to conventional systems already known.

Figure 7:
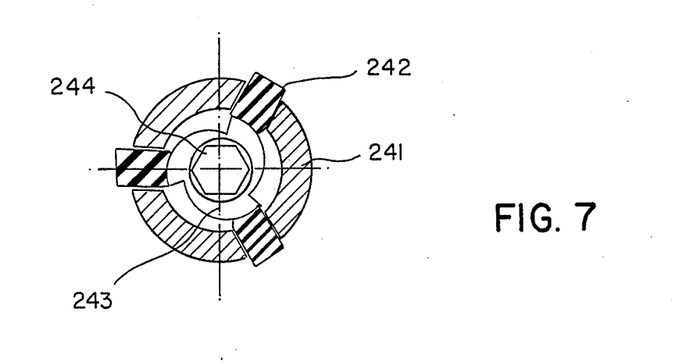
FIG. 7 illustrates the head of FIG. 5 in a section perpendicular to its axis.

Head 24 is cup-shaped and its wall 241 is provided with at least one—but preferably three—holes circumferentially arranged at 120°, the axes of which lie in a plane (VII—VII) perpendicular to the axis of stem 22. A peg 242 is freely axially slidable inside each hole.

The end (head) of the peg 242 which protrudes radially outwardly is conveniently rounded in the form of a spherical cap and its end (tail) which protrudes radially inwardly comprises an annular ridge which prevents the peg from exiting from its seat.

The peg length is such that, when the annular ridge abuts against the radially inner surface of the cup, its head protrudes outwardly from the cup wall.

The head contains a cam 243 (FIGS. 5 and 7) secured to it and fastened with a nut 244, having sharp edges, which is coaxial with the cup and can freely rotate about its own axis.

The circumferential profile of the cam comprises a plurality of arcs arranged to have a variable distance with respect to the cup axis and related to one another by radial rectilinear sections.

The number of arcs corresponds to the number of pegs and the cam profile is such that, at the position of maximum distance between the arc and the cup axis, the corresponding peg abuts against the cup wall, while, at the position of minimum distance from the axis, a sufficient clearance exists between the cam profile and the peg tail to allow the peg to slide towards the cup axis, with consequent collapse of its head into the cup wall.

It can be easily understood that when cam 243 is rotated by acting on a nut 244 previously grasped with a correspondingly shaped tool, the pegs can be blocked in a so-called "expanded" position, in which their heads will extend from the cup wall, or vice versa they can be left free to take a second position, called "collapsed", in which their heads are completely contained within the cup wall.

Finally, the cup opening can be suitably covered with a lid 245, pierced at its center, to give access to a nut 244; further, the outer lateral surface of the cup is conveniently provided with circumferential grooves containing conventional fluid-tight means 246 (O-ring) to prevent any percolation of the inflation fluid from the bladder.

Figure 6:
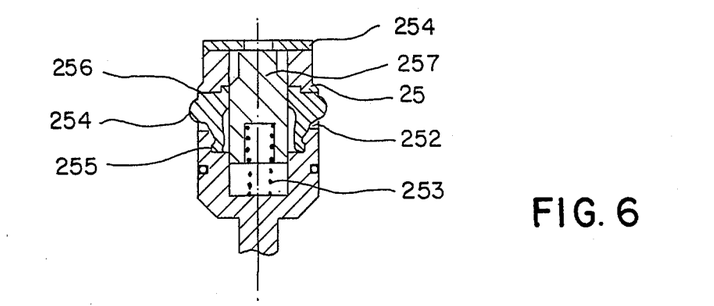
FIG. 6 illustrates in cross-section of preferred embodiment of the head of the mechanism shown in FIG. 5.

FIG. 6 illustrates a second preferred embodiment of the head assembled to the movable clamp.

According to this embodiment, the head 25, which can be screwed on stem 22, like head 24, is still cup-shaped and is conveniently closed by an axially holed lid 251. The cup contains a small piston 252, having the form of an overturned goblet, which is axially slidable in head 25, but is kept pressed against lid 251 by a helical spring 253 housed in the cavity of the small piston and working under compression.

The cup wall is provided with at least one, but preferably three, holes, circumferentially arranged at 120°, whose axis lies on the same plane, orthogonal to the cup axis.

Each of the holes contains a peg 254 composed of a central body arranged inside the hole, in which the end facing the cup outer surface has a rounded form, preferably the form of a spherical cap, and two wings 255 and 256, diametrically opposite with respect to the central body on the end of the peg directed toward the inside of the cup-shaped head, which have an axial orientation parallel to the cup axis.

The wings lean on the inner part of the cup and the end of each wing can act as a center of rotation for the peg, under the action of forces applied on the peg head, and at the same time as a mechanical stop against the removal of the peg from its seat.

It is evident that the rotation of the peg around any of the wings initiates its collapse into the cup wall, i.e. causes its movement between two positions, respectively defined as expanded and collapsed, with the same meaning as indicated above.

Actually, in the illustrated embodiment, the peg can rotate only about wing 255 and only when the small piston 252 is in contact with the cup base; in this case, as hereinafter explained, wing 256 corresponds to stem 257 of the small piston (FIG. 9), which has a diameter smaller than that of the piston body, and consequently can freely move towards the cup inside.

The engagement device or mechanism for the fixed clamp 14 will now be considered. As already said, it device 2 comprises an annular support 21, substantially composed of a cylindrical body, having an outer diameter slightly smaller than the inner diameter of tube 141 of the clamp 14, which is provided with a flanged portion 211.

Figure 8:
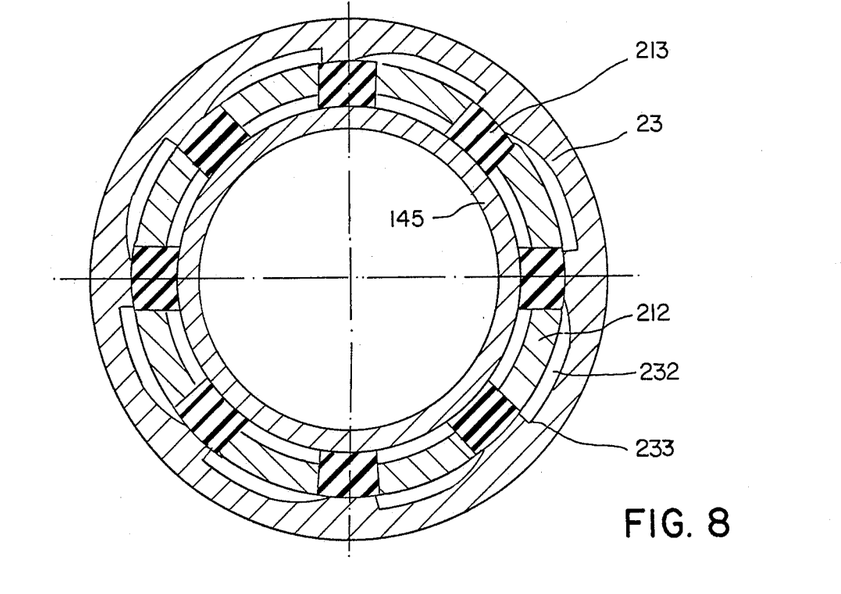
FIG. 8 illustrates, in a section perpendicular to its axis, a second portion of the mechanism shown in FIG. 5.

The surface of the flanged portion directed towards the cylindrical body, carries, fixed into it, a coaxial bush 212 whose body contains at least one, but preferably at least three, holes circumferentially arranged at 120°, the axes of which lie in a plane (VIII—VIII) perpendicular to the axis of the annular support 21.

Each of the holes contains a peg 213, freely slidable therein, whose size (along the hole axis) is greater than the thickness of the bush wall, so that the peg protrudes from the radially inner surface of the bush or protrudes from the radially outer surface of the latter, being it able, but at least, to protrude simultaneously from both of the surfaces.

For the sake of simplicity, the expression "rest position" means the position in which the pegs 213 do not extend from the radially inner surface of the bush (FIG. 9), and the expression "work position" means the diametrically opposite position, in which the pegs extend from the radially inner surface of the bush.

The movement of pegs 213 from the rest to the work position is generated by the rotation of a ring nut 23, coaxial with the annular support 21, and rotatably mounted about the flange portion 211.

The rotation of the ring nut is driven in a conventional manner by known means, by acting for example on a suitable pin 231 integrally connected to the ring nut.

The radially inner surface of the ring nut, in the position corresponding to the pegs, is in fact shaped (FIG. 8) as a broken line formed by circumferential sections radiused to one another by radial sections 233, each circumferential section 232 having one end substantially in contact with the bush body and the other end at a distance from the bush body allowing the peg 213 to collapse completely with respect to the radially inner surface of the bush, protruding obviously from the radially outer surface of the same.

At last, it is pointed out that the bush rotation can be facilitated by the use of known means 214 (roller bearings or small bearings) situated between the mutually displaceable facing surfaces; further, the body of the annular support 21 contains a duct 215 for the supply and the release of the curing fluid used to inflate the flexible sleeve of the bladder, while the surfaces of the cylindrical portions of the annular support are conveniently provided with the already cited fluid-tight means (grooves and relative O-rings 216).

After having described the construction details of the apparatus, its operation will now be taken into consideration.

Figure 9:
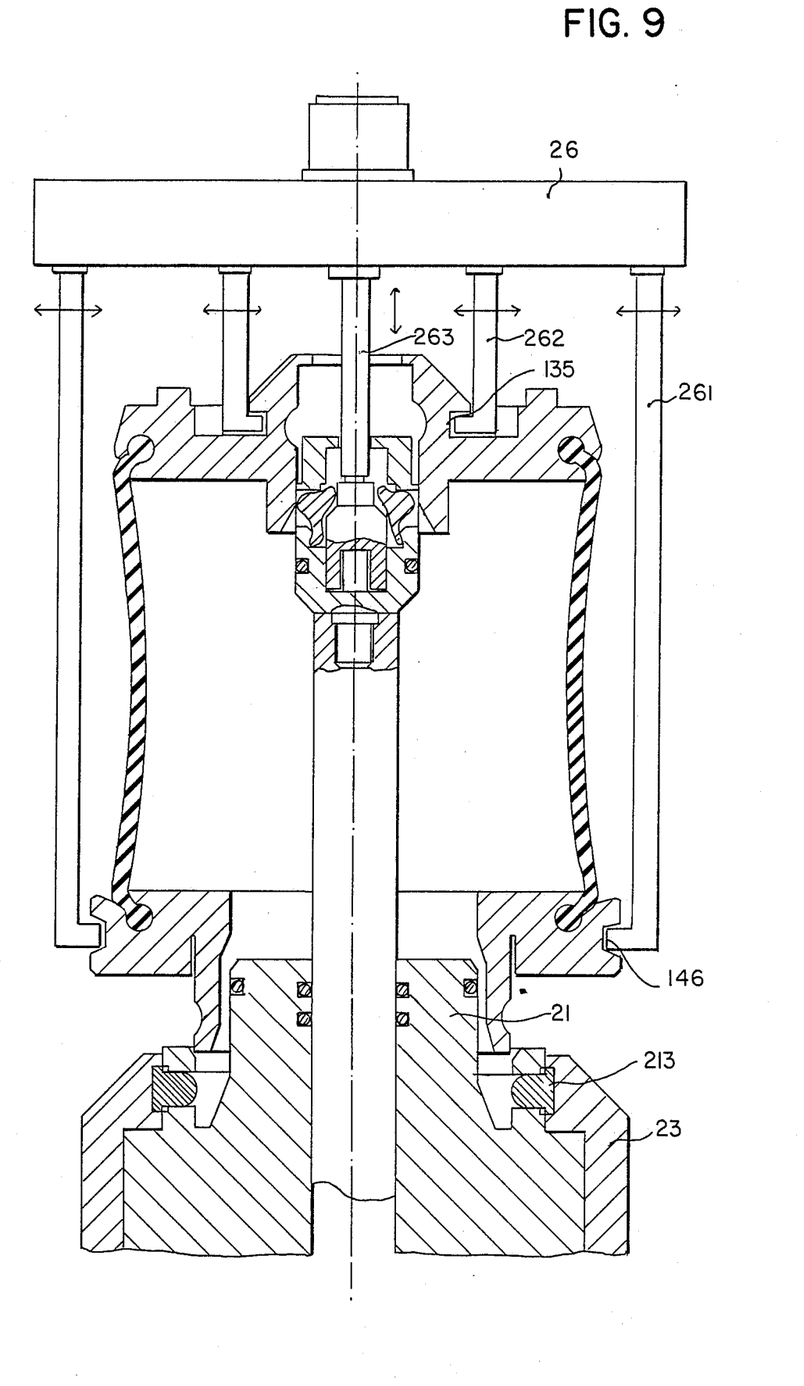
FIG. 9 illustrates the expedited automatic engagement of the bladder according to the invention on the corresponding operating mechanism.

FIG. 9 illustrates the insertion of the bladder configuration according to the present invention on the operating mechanism, carried out by means of appropriate equipment, although the operation of engagement and disengagement can be effected in any suitable way, even manually.

The bladder structure is taken up from the store area where it has been previously prepared by assembling the flexible sleeve to its clamps after having blocked the beads with the already cited fastening rings.

This operation is effected by means of an equipment 26, slidable on suitable guides (not illustrated), which allow it to be positioned over the press, now opened, in coaxial arrangement with the press axis.

Equipment 26 is provided with arms 261 and 262 circumferentially situated around a common axis, represented by a stem 263, axially movable in both senses with respect to the equipment shell.

The arms are radially movable in both senses with respect to the common axis and, preferably, are also axially slidable with respect to the shell.

The bladder is grasped by a centripetal movement in the arms, which brings their free ends, appropriately L-shaped, to be encased into the annular grooves 135 and 146 of clamp 13 and clamp 14, respectively.

Subsequently, equipment 26 takes a position coaxial to the press and begins inserting the bladder on the operating mechanism (FIG. 9).

The operating mechanism has been prepared by lifting stem 22 to allow the insertion of both clamps on the respective supports with the cylindrical sleeve in stretched position; moreover, ring nut 23 has been rotated in the position corresponding to the rest position of the pegs.

The operation is described with reference to the case in which stem 22 is equipped with a head 25; however, the different behavior of the same stem, equipped with a head 24, will be brought into evidence hereinafter.

As soon as the coaxial arrangement of the equipment, the bladder structure and the mechanism has been carried out, stem 263 of the equipment is pushed against head 25, enters the head and presses the small piston 257, overcoming the action of the helical spring 253, into the cup base, so that pegs 254 are allowed to rotate freely about wing 255 and therefore to be embedded in the thickness of the head wall.

Next the bladder is lowered towards the operating mechanism. It is evident, after the above description and with reference to FIG. 9, that the radially inner surface of hub 132 interferes with the pegs, causing them to collapse into the head. The movement is continued until the axially outer portion of the hub against the axially outer surface of head 25 and stops.

In this position the annular groove 136 on the hub is situated corresponding to the pegs heads 254.

As regards clamp 14, the situation is identical. Tube 141, in its downward movement towards support 21, interferes with the heads of pegs 213, which might protrude from the radially inner surface of the bush, originating their collapse into the bush wall.

The movement stops when the lower end of the tube abuts against the wall of the flange 211 of the annular support. In this position the annular groove 145 obtained on the tube body is positioned corresponding to the heads of pegs 213.

At this time, ring nut 23 is rotated to be brought to the work position illustrated in FIG. 8. On account of the rotation, not only pegs 213 exit from their hole, encasing their heads into the annular groove 145, but also remain blocked in that position.

At the same time, the pressure acting on stem 263 of the equipment is released.

Owing to the release of spring 235, the small piston 252 rises again towards the upper end of head 25, pushing stem 263, now freely slidable, and consequently pushing radially outward, with respect to the cup, the pegs 254, whose heads are encased in groove 136 of the hub, so that they remain blocked in this position (FIG. 6).

Now arms 261 and 262 are radially moved, disengaging them from clamps 13 and 14, so that equipment 26 can move away from the press, leaving the latter provided with the new bladder configuration and ready for the re-starting of the curing operations.

The bladder disengagement takes place in a clearly understandable manner, by effecting all of the above described operations in an inverted sequence and is particular by allowing pegs 254 and 213 to move freely into their seats by virtue of the thrust exerted by the two clamps, as already seen, namely with the aid of stem 263 and by rotating ring nut 23 in an opposite sense.

Obviously, during the disengagement of the movable clamp 13, pegs 254 rotate about wing 255.

At this moment, the differences in the operating process, necessary when stem 22 is equipped with head 24, will be clearly apparent. In that case the end of stem 263 must have a shape able to fit with the prismatic head of nut 244, so as to cause the latter, together with arm 243, to rotate axially in order to release and to block pegs 242 alternatively, analogously to what happens in respect of pegs 213.

However, it was pointed out that preference is given to the system using head 25.

To understand the reason of this preference it is to be taken into account that the above described expedited engagement and disengagement of the bladder must give the operator the assurance that, in particular, the engagement step has been properly effected, namely that the heads of the various pegs are firmly blocked into the corresponding annular grooves provided in the two clamps. In fact, in the contrary case, the admission of fluid under pressure and at a high temperature into the bladder might originate the disengagement of the clamps from the relative supports, with serious consequences for the safety of the operators working in proximity of the press and for the machine itself.

As regards the fixed clamp, no problems are involved. The complete rotation of the ring nut between the two positions (rest and work) of pegs 213 can be easily checked since the positions are, or can be, rendered stationary with respect to the press base. Vice versa, as regards clamp 13, in the arrangement comprising head 24, equipment 26 must be provided with devices able not only to perform the coaxial positioning of stem 263 with respect to the press axis, but also the correct relationship with a certain angular orientation between stem 263 and nut 244, since only in the stated mutual angular positions is it possible to connect the stem with the nut; further, equipment 26 must be provided with devices intended to measure the entity of the rotation effected by stem 263.

All of the prior art devices make equipment 26 more complicated and expensive.

On the contrary, with head 25, stem 263 must effect only axial movements, easily obtained by means of a fluid-dynamic cylinder, while the position for blocking pegs 254 (small piston 252 in the top dead center) can be easily located by checking the axial displacement of stem 263, the check being made by means of transducers much simpler and cheaper than those indicating angular positions.

In conclusion, by the adoption of head 25 the equipment is simpler, more reliable and less expensive and the engagement and disengagement operations are slightly quicker than those obtainable by using head 24.

Reference is now made to the previous statement made with respect to the bladder, according to which the annular grooves on the hub of clamp 13 and on the tube of clamp 14 can be provided in any suitable position, and in particular even on the surfaces radially opposite to those illustrated.

It is now clear that the grooves, being intended to receive the heads of the pegs which block the clamps on their corresponding elements of the support mechanism, must be situated at the pegs, which can be located in positions completely different from those illustrated above.

By way of example, a technician skilled in this field will have no difficulty in devising an annular support 21 inside which the pegs are housed in appropriate grooves obtained in the cylindrical portion of the support, with the consequent elimination of bush 212 and ring nut 23.

Likewise, it will be easy to conceive a head, associated to the end of stem 22, which, instead of being inserted in the hub 132, is inserted on the hub or better on a corresponding pin; in which case it would be necessary to vary again the relative position of pegs 242, distributing them circumferentially at the radially outer surface of the hub, which latter will be therefore replaced with the pin.

As to the pegs, they can be obviously obtained in any way which is technically equivalent to that described above; in other words, they can be small cylinders, prismatic stems or spheres, and can be connected to an appropriate operating mechanism also in respect of their movement from the work to the rest position. In other words, also the displacement which releases the pegs from their position of interference with the clamps can be obtained, for instance, by the rotation of ring nut 23 and of cam 243 or by the axial stroke of small piston 252.

The bladder and the relative mechanism in accordance with the invention have achieved all the proposed aims and appear to be extremely advantageous. In fact, they have a very simple structure, cheap and quite reliable. They permit automatic substitution of the bladder configuration, without any manual intervention while the press is still hot, at a very short time interval. In the preferred embodiment, they require only the axial centering between the bladder structure, the mechanism and the picking up equipment, with the exclusion of any angular orientation with respect to the press axis, improving therefore the remarkable advantages already obtained with the more general embodiment of the device according to the invention.

Finally, it is evident that the present invention has only an explanatory and not restricting purpose, so that it includes all the possible modifications and variations which, although not specifically described herein, are easily conceivable by a technician skilled in this field on the ground of the present inventive idea.

I claim:

1. A bladder assembly comprising a substantially cylindrical, flexible and elastically deformable sleeve (10) provided with first and second beads on first and second ends of said sleeve, a movable clamp (13) to block said first end of said sleeve and a fixed clamp (14) to block said second end of said sleeve, said movable clamp comprising a disc (131) provided with a coaxial hub (132) and a first fastening ring (133) secured to said disc, said disc and said first fastening ring each having a peripheral portion which can be associated with said first bead of said sleeve, and connecting means to block said first bead on said movable clamp between said disc and said first fastening ring, said fixed clamp comprising a tube portion (141) having a flanged end and a pair of distinct coaxial elements including a second fastening ring (142) integrally associated with a flange edge (143), each element having an annular portion of its surface which can be associated with said second bead of said sleeve, and connecting means to block said second bead on said fixed clamp, and means for the automatic engagement and disengagement of said movable and fixed clamps with respect to a corresponding support and operating mechanism, said means comprising at least one coaxial annular groove provided on said coaxial hub of said movable clamp and at least one coaxial annular groove provided on said tube body.

2. A bladder assembly as in claim 1, wherein said at least one coaxial annular groove on said coaxial hub is provided on a radially inner surface thereof.

3. A bladder assembly as in claim 1, wherein said at least one annular groove on said tube body is provided on a radially outer surface thereof.

4. A bladder assembly as in claim 1, further including means that allows said bladder assembly to be picked up, transported and released.

5. A bladder assembly as in claim 4, wherein said means comprises additional annular grooves on the outer surface of both of said movable and fixed clamps.

6. A bladder assembly as in claim 5, wherein said annular groove on said movable clamp is provided on a radially outer surface of said coaxial hub, axially external with respect to said bladder assembly.

7. A bladder assembly as in claim 5, wherein said annular groove on said fixed clamp is provided on a radially outer surface of said second fastening ring (142).

8. An operating mechanism which provides for fast, easy and automatic changing of a bladder assembly on a curing press comprising an annular support body (21) with a support axis associated with said curing press, a stem (22) coaxial with said annular support body, axially slidable therein, an annular ring nut coaxially rotatable around said annular support body, means to axially displace said stem with respect to said annular support body, and means for the automatic engagement and disengagement of said operating mechanism with said bladder assembly, said engaging and disengaging means comprising a head integrally associated with a free end of said stem, said head comprising at least one peg housed in a corresponding hole provided in said head, which can be radially moved with respect to an axis of said stem, between an expanded position in which said at least one peg protrudes from a radial surface of a lateral wall of said head and a collapsed position in which said at least one peg is completely contained within said lateral wall of said head, and a coaxial cam means to move said at least one peg from said collapsed position to said expanded position, and at least one peg housed in a corresponding hole provided in said support body which is radially displaceable with respect to an axis of said support body, between a work position in which said at least one peg protrudes from said corresponding hole housing said respective peg and a rest position in which said at least one peg does not protrude from said corresponding hole housing said respective peg, said annular ring nut being provided to move said at least one peg from said rest position to said work position.

9. An operating mechanism as in claim 8, wherein said head is cup-shaped, said holes intended to house said at least one peg being provided in said lateral wall of said cup-shaped head, said cup-shaped head containing said coaxial cam means, rotatable about its own axis, which cam has a continuous peripheral profile lying in a plane perpendicular to said stem axis, which plane contains axis of said at least one peg, a distance of said profile from said cam axis being continuously variable from a minimum value to a maximum value and from said maximum value to said minimum value, said distance of minimum value corresponding to said expanded position and said distance of maximum value corresponding to said collapsed position.

10. An operating mechanism as in claim 8, wherein said head is shaped like a cup, having a lateral wall provided with a multiplicity of radial holes, with their axis lying in a plane perpendicular to said stem axis intended to house corresponding pegs which can be alternatively movable radially between said expanded position and said collapsed position, each peg being provided with two axially opposite wings on the end of the peg directed towards an inside of said head, movement of said pegs between said two positions being initiated by rotation of a respective peg about one of said wings, said cup-shaped head containing a small coaxial piston, shaped as an overturned goblet, which is axially slidable within said head, means to prevent said piston from exiting from said cup-shaped head and elastically deformable means provided to control axial displacement of said piston with respect to said cup-shaped head.

11. An operating mechanism as in claim 10, wherein said support body includes an annular flange (211) integral therewith situated on its end axially opposed to said head integral to said stem, a bush portion (212) coaxial therewith which houses said at least one peg, which axially protrudes from said flange in the direction of said head, said annular ring nut (23) coaxial with said support body being rotatable about said flange, having a surface facing a radially outer surface of said bush, such that said at least one peg being housed in corresponding holes in said bush portion is contacted by said surface of said ring nut, said ring nut (23) having on said surface facing said bush portion at said at least one peg, a continuous profile whose distance from said support axis varies alternatively between a maximum and a minimum value, respectively, said distance of minimum value corresponding to said work position and said distance of maximum value corresponding at least to said rest position.

12. A bladder assembly and operating mechanism for providing fast, easy and automatic changing of said bladder assembly on a curing press, including in combination:

a bladder assembly comprising a substantially cylindrical, flexible and elastically deformable sleeve (10) provided with first and second beads on first and second ends of said sleeve, a movable clamp (13) to block said first end of said sleeve and a fixed clamp (14) to block said second end of said sleeve, said movable clamp comprising a disc (131) provided with a coaxial hub (132) and a first fastening ring (133) secured to said disc, said disc and said first fastening ring each having a peripheral portion which can be associated with said first bead of said sleeve, and connecting means to block said first bead on said movable clamp between said disc and said first fastening ring, said fixed clamp comprising a tube portion (141) having a flanged end and a pair of distinct coaxial elements including a second fastening ring (142) integrally associated with a flange edge (143), each element having an annular portion of its surface which can be associated with said second bead of said sleeve, and connecting means to block said second bead on said fixed clamp, and means for the automatic engagement and disengagement of said movable and fixed clamps with respect to a corresponding support and operating mechanism, said means comprising at least one coaxial annular groove provided on said coaxial hub of said movable clamp and at least one coaxial annular groove provided on said tube body, and an operating mechanism comprising an annular support body (21) with a support axis associated with said curing press, a stem (22) coaxial with said annular support body, axially slidable therein, to be associated with said movable clamp of said bladder assembly, an annular ring nut coaxially rotatable around said annular support body, means to axially displace said stem with respect to said annular support body, and means for the automatic engagement and disengagement of said movable and fixed clamps of said bladder assembly, said engaging and disengaging means comprising a head integrally associated with a free end of said stem, said head comprising at least one peg housed in a corresponding hole provided in said head, which can be radially moved with respect to an axis of said stem, between an expanded position in which said at least one peg protrudes from a radial surface of a lateral wall of said head and a collapsed position in which said at least one peg is completely contained within said lateral wall of said head, and a coaxial cam means to move said at least one peg from said collapsed position to said expanded position, said at least one peg in an expanded position at least partially protruding from said radial surface of said head facing a corresponding surface of said coaxial hub of said movble clamp, and at least one peg housed in a corresponding hole provided in said support body which is radially displaceable with respect to an axis of said support body, between a work position in which said at least one peg protrudes from said corresponding hole housing said respective peg and a rest position in which said at least one peg does not protrude from said corresponding hole housing said respective peg, said annular ring nut being provided to move said at least one peg from said rest position to said work position, said at least one peg in a work position at least partially protruding from said radial surface of said support body facing a corresponding surface of said tube portion of said fixed clamp.

13. A bladder assembly and operating mechanism as in claim 12, wherein with respect to said bladder assembly said at least one coaxial annular groove on said coaxial hub is provided on a radially inner surface thereof.

14. A bladder assembly and operating mechanism as in claim 12, wherein with respect to said bladder assembly said at least one annular groove on said tube body is provided on a radially outer surface thereof.

15. A bladder assembly and operating mechanism as in claim 12, wherein said bladder assembly further includes means that allows said bladder assembly to be picked up, transported and released.

16. A bladder assembly and operating mechanism as in claim 15, wherein said means comprises additional annular grooves on the outer surface of both of said movable and fixed clamps.

17. A bladder assembly and operating mechanism as in claim 12, wherein with respect to said bladder assembly said annluar groove on said movable clamp is provided on a radially outer surface of said coaxial hub, axially external with respect to said bladder assembly.

18. A bladder assembly and operating mechanism as in claim 12, wherein with respect to said bladder assembly said annular groove on said fixed clamp is provided on a radially outer surface of said second fastening ring (142).

19. A bladder assembly and operating mechanism as in claim 12, wherein with respect to said operating mechanism said head is cup-shaped, said holes intended to house said at least one peg being provided in said lateral wall of said cup-shaped head, said cup-shaped head containing said coaxial cam means, rotatable about its own axis, which cam has a continuous peripheral profile lying in a plane perpendicular to said stem axis, which plane contains an axis of said at least one peg, a distance of said profile from said cam axis being continuously variable from a minimum value to a maximum value and from said maximum value to said minimum value, said distance of minimum value corresponding to said expanded position and said distance of maximum value corresponding to said collapsed position.

20. A bladder assembly and operating mechanism as in claim 12, wherein with respect to said operating mechanism said head is shaped like a cup, having a lateral wall provided with a multiplicity of radial holes with their axis lying in a plane perpendicular to said stem axis intended to house corresponding pegs which can be alternatively movable radially between said expanded position and said collapsed position, each peg being provided with two axially opposite wings on the end of the peg directed towards an inside of said head, movement of said pegs between said two positions being initiated by rotation of a respective peg about one of said wings, said cup-shaped head containing a small coaxial piston, shaped as an overturned goblet, which is axially slidable within said head, means to prevent said piston from exiting from said cup-shaped head and elastically deformable means provided to control axial displacement of said piston with respect to said cup-shaped head.

21. A bladder assembly and operating mechanism as in claim 12, wherein with respect to said operating mechanism said support body includes an annular flange (211) integral therewith situated on its end axially opposed to said head integral to said stem, a bush portion (212) coaxial therewith which houses said at least one peg, which axially protrudes from said flange in the direction of said head, said annular ring nut (23) coaxial with said support body being rotatable about said flange, having a surface facing a radially outer surface of said bush, such that said at least one peg being housed in corresponding holes in said bush portion is contacted by said surface of said ring nut, said ring nut (23) having on said surface facing said bush portion at said at least one peg, a continuous profile whose distance from said support axis varies alternatively between a maximum and a minimum value, respectively, said distance of minimum value corresponding to said work position and said distance of maximum value corresponding at least to said rest position.

* * * * *